(12) United States Patent
Sturgin et al.

(10) Patent No.: US 9,188,167 B2
(45) Date of Patent: Nov. 17, 2015

(54) CLUTCH HOUSING WITH LEVER SPRING RETENTION SLOTS AND METHOD OF INSTALLING A LEVER SPRING

(75) Inventors: Todd Sturgin, Shreve, OH (US); Adam Uhler, Sterling, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1864 days.

(21) Appl. No.: 11/706,584

(22) Filed: Feb. 15, 2007

(65) Prior Publication Data

US 2007/0193844 A1    Aug. 23, 2007

Related U.S. Application Data

(60) Provisional application No. 60/775,623, filed on Feb. 22, 2006, provisional application No. 60/775,619, filed on Feb. 22, 2006, provisional application No. 60/775,620, filed on Feb. 22, 2006, provisional application No. 60/775,621, filed on Feb. 22, 2006, provisional application No. 60/775,622, filed on Feb. 22, 2006.

(51) Int. Cl.
*F16D 13/56* (2006.01)
*F16D 21/06* (2006.01)
*F16D 13/58* (2006.01)

(52) U.S. Cl.
CPC .............. *F16D 13/56* (2013.01); *F16D 13/585* (2013.01); *F16D 2021/0676* (2013.01)

(58) Field of Classification Search
CPC    F16D 13/56; F16D 13/585; F16D 2021/0676
USPC .............. 192/70.19, 70.2, 70.29, 70.3, 87.11, 192/89.24, 112, 48.8–48.91, 89.22–89.23, 192/70.27
See application file for complete search history.

(56) References Cited

U.S. PATENT DOCUMENTS

| 1,601,235 A | * | 9/1926 | Bullard, Jr. et al. | ......... 192/70.29 |
| 1,939,888 A | * | 12/1933 | Fink | ........................... 192/70.28 |
| 2,485,214 A | * | 10/1949 | Deimel et al. | .............. 192/70.22 |
| 2,806,568 A | * | 9/1957 | Bliss | ............................ 192/99 R |
| 2,976,569 A | | 6/1959 | Quere et al. | |
| 3,009,553 A | | 11/1961 | Henyon | ......................... 192/48 |
| 3,291,272 A | | 12/1966 | Fawick | .......................... 192/84 |

(Continued)

FOREIGN PATENT DOCUMENTS

| DE | 2608348 | 9/1976 |
| DE | 4343112 | 6/1995 |

(Continued)

*Primary Examiner* — Terry Chau
(74) *Attorney, Agent, or Firm* — Simpson & Simpson, PLLC

(57) ABSTRACT

The present invention broadly comprises a spring-retaining clutch housing including a housing wall and at least one opening in the wall. The opening is arranged to accept at least a portion of a lever spring for a clutch assembly. The lever spring includes at least one protrusion, extending from an outer circumference of the spring, with top and bottom sides. The opening defines edges in the housing wall axially displaced one to the other. The edges are arranged to be contacted by the top and bottom sides, respectively. In some aspects, contact with edges is arranged to provide forces in two, opposite axial directions. In some aspects, the housing is arranged for installation in a clutch assembly with a bearing and a clutch and the forces are for a pre-load force for the assembly bearing or with respect to an axial force generated during operation of the clutch.

14 Claims, 12 Drawing Sheets

(56) References Cited

U.S. PATENT DOCUMENTS

| | | | |
|---|---|---|---|
| 4,082,171 A * | 4/1978 | Lalin et al. | 192/70.2 |
| 4,111,291 A | 9/1978 | Horstman | 192/105 C |
| 5,875,536 A | 3/1999 | Ring | 29/407.1 |
| 6,196,078 B1 | 3/2001 | DeJonge et al. | 74/473.12 |
| 6,276,505 B1 * | 8/2001 | Hofmann et al. | 192/70.27 |
| 6,497,158 B1 | 12/2002 | Daly et al. | 73/866.5 |
| 6,533,705 B1 | 3/2003 | Giefer et al. | 477/96 |
| 6,588,294 B1 | 7/2003 | Rogg | 74/473.21 |
| 6,708,807 B1 | 3/2004 | Martin | 192/70.19 |
| 6,819,997 B2 | 11/2004 | Buchanan et al. | 701/67 |
| 6,976,569 B2 | 12/2005 | Khaykin et al. | 192/220.2 |
| 7,124,869 B2 * | 10/2006 | Hoebel et al. | 192/48.91 |
| 7,150,347 B2 * | 12/2006 | Doherty et al. | 192/70.2 |
| 7,823,711 B2 * | 11/2010 | Uhler et al. | 192/48.8 |
| 2005/0139442 A1 * | 6/2005 | Agner et al. | 192/48.8 |
| 2005/0263366 A1 * | 12/2005 | Eisengruber | 192/70.3 |
| 2005/0279603 A1 * | 12/2005 | Agner | 192/48.8 |
| 2007/0193845 A1 * | 8/2007 | Uhler | 192/70.27 |

FOREIGN PATENT DOCUMENTS

| | | |
|---|---|---|
| DE | 4408666 | 9/1995 |
| DE | 10241513 A1 * | 3/2004 |
| DE | 10338558 | 3/2004 |
| DE | 10334867 | 2/2005 |
| DE | 102005027610 | 12/2005 |
| EP | 0299 235 B1 | 1/1989 |
| EP | 0812998 | 8/2001 |
| EP | 1 186 462 A3 | 3/2002 |
| EP | 1422430 | 5/2004 |
| EP | 1548313 A2 * | 6/2005 |
| EP | 1610021 | 12/2005 |
| EP | 1 632 382 B1 | 10/2007 |
| FR | 2 813 361 | 3/2002 |
| JP | 63214524 | 9/1988 |
| WO | WO 03/041989 A3 | 5/2003 |
| WO | WO 2007/054050 A1 | 5/2007 |

* cited by examiner ly inward from the housing wall. The blocking element is arranged to prevent rotational movement of the lever spring after the at least one opening has accepted the at least a portion of a lever spring. In some aspects, the housing wall includes at least one annular surface, the lever spring includes at least one spring protrusion with a top side and a bottom side, and the lip and the at least one annular surface are arranged to contact the top side and the bottom side, respectively. In some aspects, the contact with the lip is arranged to provide a force in a first axial direction and the contact with the annular surface is arranged to provide a force in a second axial direction, opposite the first axial direction. In some aspects, the housing is arranged for installation in a clutch assembly interfacing with a bearing, the first force is with respect to a pre-load force for the bearing, and the second force is with respect to an axial force generated during operation of the clutch assembly. In some aspects, the section is integral to the housing wall, or the section is separate from the housing wall and attached to the housing wall. In some aspects, the section or the housing are machined.

CLUTCH HOUSING WITH LEVER SPRING RETENTION SLOTS AND METHOD OF INSTALLING A LEVER SPRING

CROSS-REFERENCE TO RELATED APPLICATIONS

This application claims the benefit under 35 U.S.C. §119 (e) of U.S. Provisional Application No. 60/775,623 filed Feb. 22, 2006; U.S. Provisional Application No. 60/775,619 filed Feb. 22, 2006; U.S. Provisional Application No. 60/775,620 filed Feb. 22, 2006; U.S. Provisional Application No. 60/775,621 filed Feb. 22, 2006; and U.S. Provisional Application No. 60/775,622 filed Feb. 22, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a clutch housing with enclosed slots for retaining a lever spring, slots for retaining an inner clutch housing, and a method for installing the lever spring.

BACKGROUND OF THE INVENTION

Commonly assigned, and therefore, uncitable, United States Patent Application No. 2005/0139442 filed Dec. 23, 2004 and published Jun. 30 2005, which application is incorporated herein by reference, shows the use of lever springs in a mechanically actuated clutch assembly. Multiple retaining rings can be welded on a housing to retain the springs. Snap rings, pivot rings, and diaphragm springs also can be used to secure lever springs. A mechanically actuated assembly could be improved by decreasing the cost of the housing with respect to securing the springs and by reducing the complexity and cost of assembling and securing lever springs in the housing.

Thus, there is a long-felt need for a clutch housing that can be quickly and inexpensively manufactured and in which lever springs can be easily and inexpensively installed.

BRIEF SUMMARY OF THE INVENTION

The present invention broadly comprises a spring-retaining clutch housing including a substantially cylindrical housing wall and at least one opening in the housing wall. The at least one first opening is operatively arranged to accept at least a portion of a lever spring for a clutch assembly. The lever spring includes at least one protrusion, extending from an outer circumference of the spring, with a top side and a bottom side. The opening defines first and second edges in the housing wall axially displaced one to the other. The edges are arranged to be contacted by the top and bottom sides, respectively. In some aspects, the contact with the first edge is arranged to provide a force in a first axial direction and the contact with the second edge is arranged to provide a force in a second axial direction, opposite the first axial direction. In some aspects, the housing is arranged for installation in a clutch assembly interfacing with a bearing, the first force is with respect to a pre-load force for the bearing, and the second force is with respect to an axial force generated during operation of the clutch assembly.

In some aspects, for some of the openings, respective first edges are axially offset or respective second edges are axially offset. In some aspects, some of the openings are axially displaced one to the other. In some aspects, axial widths vary for the openings, or the openings include slots circumferentially aligned with the housing wall. In some aspects, the openings are fully enclosed by the housing wall, or the openings are in communication with an open end of the wall. The housing wall includes a diameter, the lever spring includes, in a relaxed state, an outer diameter, and the spring diameter is greater than the wall diameter. In some aspects, the housing is stamped.

In some aspects, the housing wall includes a section with a lip extending radially from the housing wall, the lip has an inner circumference, and the at least one opening is disposed in the lip and in communication with the inner circumference. The housing also includes a blocking element extending radially inward from the housing wall. The blocking element is arranged to prevent rotational movement of the lever spring after the at least one opening has accepted the at least a portion of a lever spring. In some aspects, the housing wall includes at least one annular surface, the lever spring includes at least one spring protrusion with a top side and a bottom side, and the lip and the at least one annular surface are arranged to contact the top side and the bottom side, respectively. In some aspects, the contact with the lip is arranged to provide a force in a first axial direction and the contact with the annular surface is arranged to provide a force in a second axial direction, opposite the first axial direction. In some aspects, the housing is arranged for installation in a clutch assembly interfacing with a bearing, the first force is with respect to a pre-load force for the bearing, and the second force is with respect to an axial force generated during operation of the clutch assembly. In some aspects, the section is integral to the housing wall, or the section is separate from the housing wall and attached to the housing wall. In some aspects, the section or the housing are machined.

The invention also broadly comprises an outer clutch housing with a substantially cylindrical housing wall with at least one opening. The opening is arranged to accept a plurality of radial protrusions for an inner clutch housing in a clutch assembly. The opening also includes a first radial edge and a first axial edge. A first protrusion in the plurality of protrusions includes a first radial surface and a first axial surface. The first axial edge is arranged to contact the first axial surface and to transfer torque to the first axial surface. The first radial edge is arranged to contact the first radial surface.

In some aspects, the opening includes a second axial edge circumferentially displaced from the first axial edge and a second protrusion in the plurality of protrusions includes a second axial surface. Then, the second axial edge is arranged to contact the second axial surface to prevent rotational movement of the housing with respect to the inner clutch housing. In some aspects, the opening includes a second radial edge, axially displaced from the first radial edge and the second protrusion includes a second radial surface. The second radial edge and the second radial surface are axially opposed and axially displaced one to the other.

The present invention also broadly comprises a method for installing a lever spring in a clutch housing, including: applying force, in an axial direction, proximate an inner circumference of a substantially annularly shaped lever spring; at least partially inserting the spring into an open end of the housing; releasing the force; and, passing at least a portion of at least one protrusion on an outside circumference of the spring through at least one opening in the housing. The spring further comprises an outside diameter and the housing further comprises an inside diameter and the method includes applying the force until the outside diameter is less than the inside diameter.

It is a general object of the present invention to provide a clutch housing with a simplified means for retaining a lever spring.

It is another object of the present invention to provide a clutch housing configured to retain a lever spring having a relaxed outside diameter greater than an inside diameter for the housing.

It is yet another object of the present invention to provide a method for installing a lever spring in a clutch housing.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 12A:
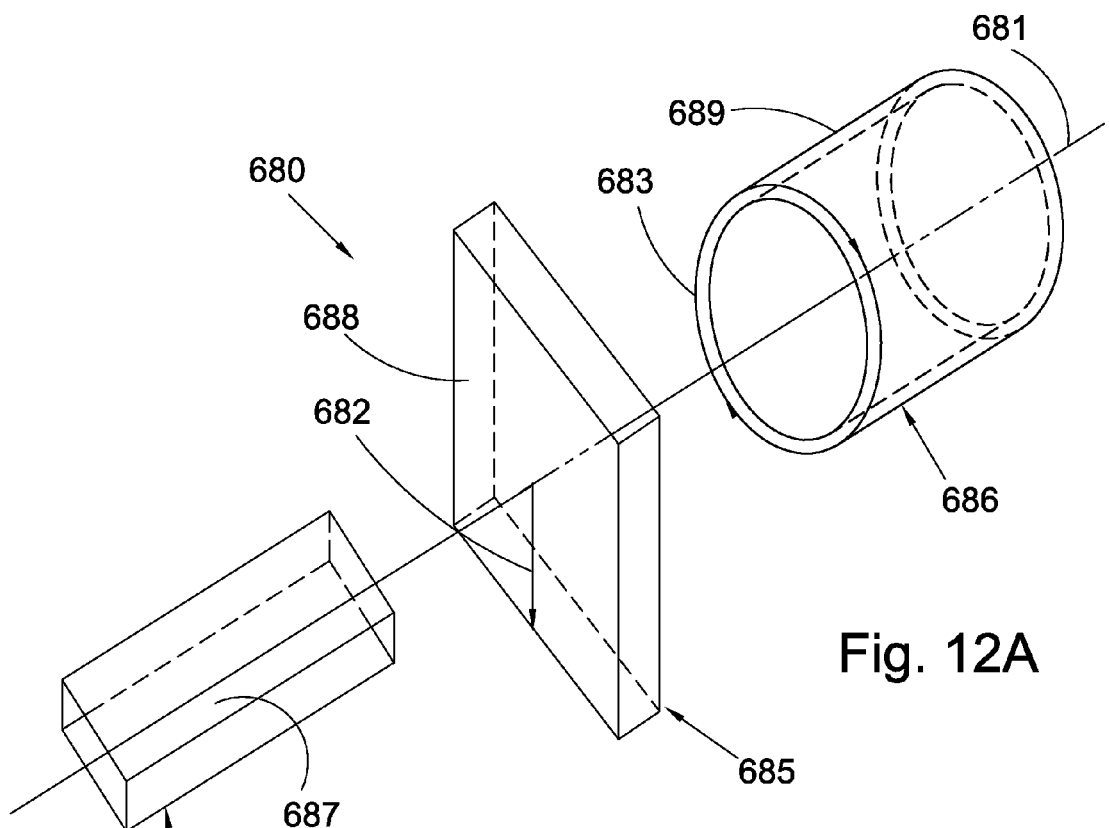
FIG. 12A is a perspective view of a cylindrical coordinate system demonstrating spatial terminology used in the present application.

FIG. 12A is a perspective view of cylindrical coordinate system 680 demonstrating spatial terminology used in the present application. The present invention is at least partially described within the context of a cylindrical coordinate system. System 680 has a longitudinal axis 681, used as the reference for the directional and spatial terms that follow. The adjectives "axial," "radial," and "circumferential" are with respect to an orientation parallel to axis 681, radius 682 (which is orthogonal to axis 681), and circumference 683, respectively. The adjectives "axial," "radial" and "circumferential" also are regarding orientation parallel to respective planes. To clarify the disposition of the various planes, objects 684, 685, and 686 are used. Surface 687 of object 684 forms an axial plane. That is, axis 681 forms a line along the surface. Surface 688 of object 685 forms a radial plane. That is, radius 682 forms a line along the surface. Surface 689 of object 686 forms a circumferential plane. That is, circumference 683 forms a line along the surface. As a further example, axial movement or disposition is parallel to axis 681, radial movement or disposition is parallel to radius 682, and circumferential movement or disposition is parallel to circumference 683. Rotation is with respect to axis 681.

The adverbs "axially," "radially," and "circumferentially" are with respect to an orientation parallel to axis 681, radius 682, or circumference 683, respectively. The adverbs "axially," "radially," and "circumferentially" also are regarding orientation parallel to respective planes.

Figure 12B:
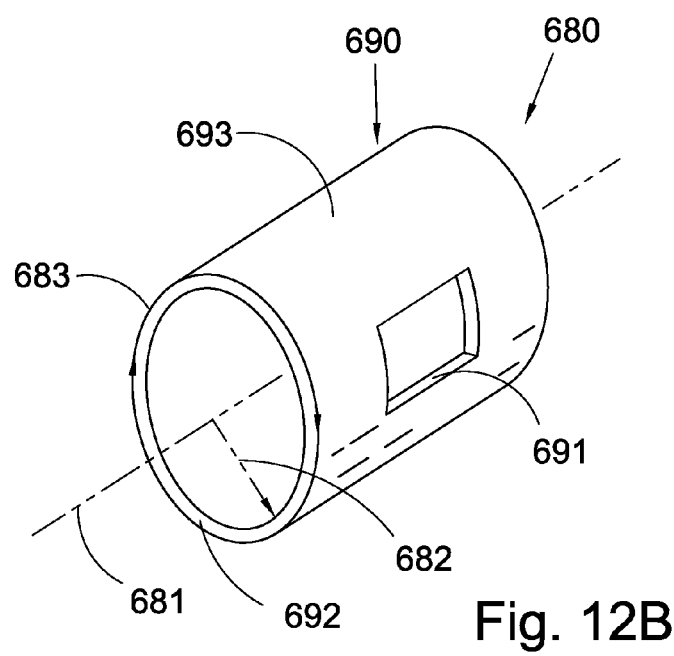
FIG. 12B is a perspective view of an object in the cylindrical coordinate system of FIG. 12A demonstrating spatial terminology used in the present application.

FIG. 12B is a perspective view of object 690 in cylindrical coordinate system 680 of FIG. 12A demonstrating spatial terminology used in the present application. Cylindrical object 690 is representative of a cylindrical object in a cylindrical coordinate system and is not intended to limit the present invention is any manner. Object 690 includes axial surface 691, radial surface 692, and circumferential surface 693. Surface 691 is part of an axial plane, surface 692 is part of a radial plane, and surface 693 is part of a circumferential plane.

Figure 1:
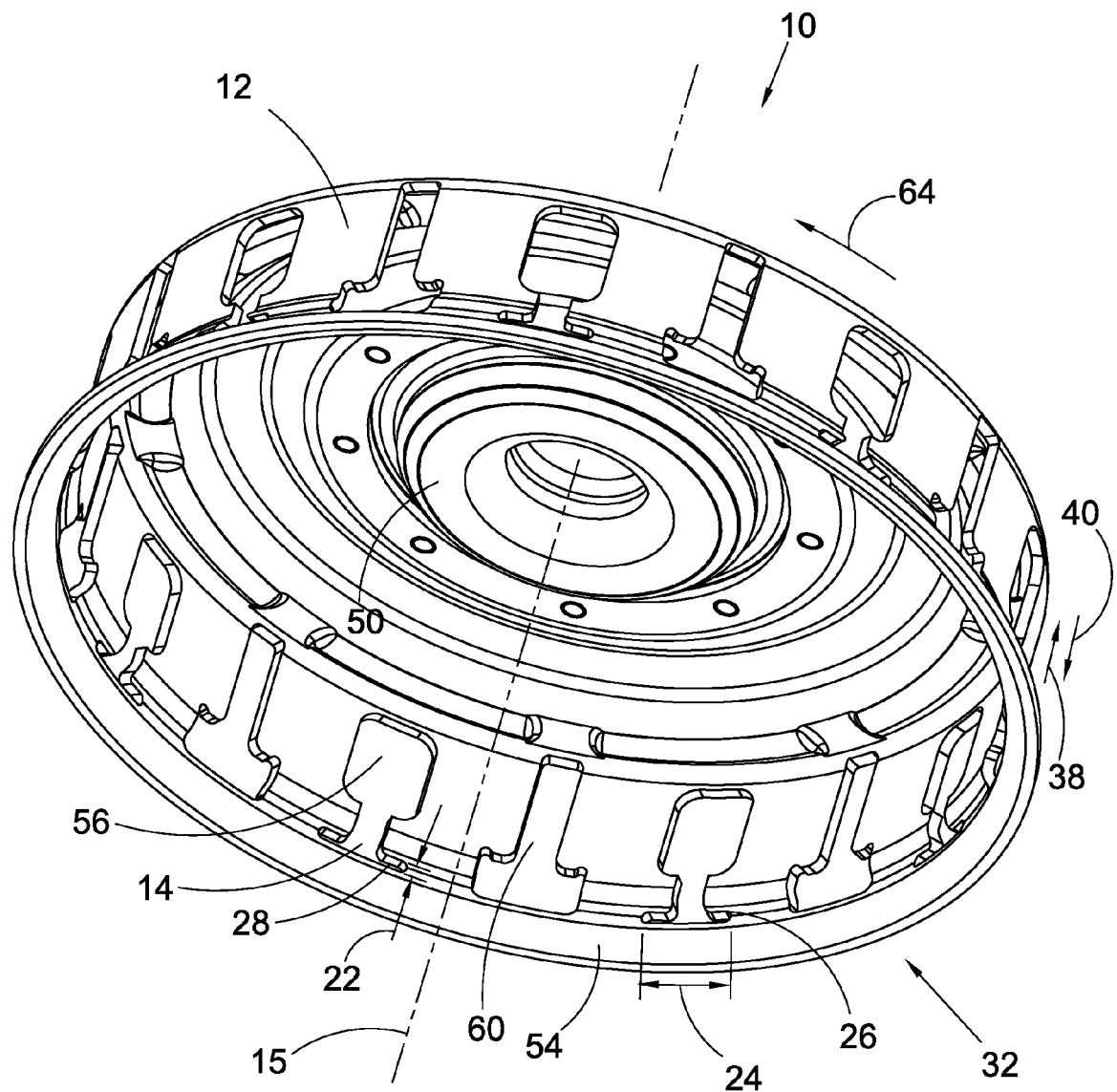
FIG. 1 is a perspective view of an outer clutch housing with present invention spring retention openings.

FIG. 1 is a perspective view of present invention outer clutch housing 10.

Figure 2:
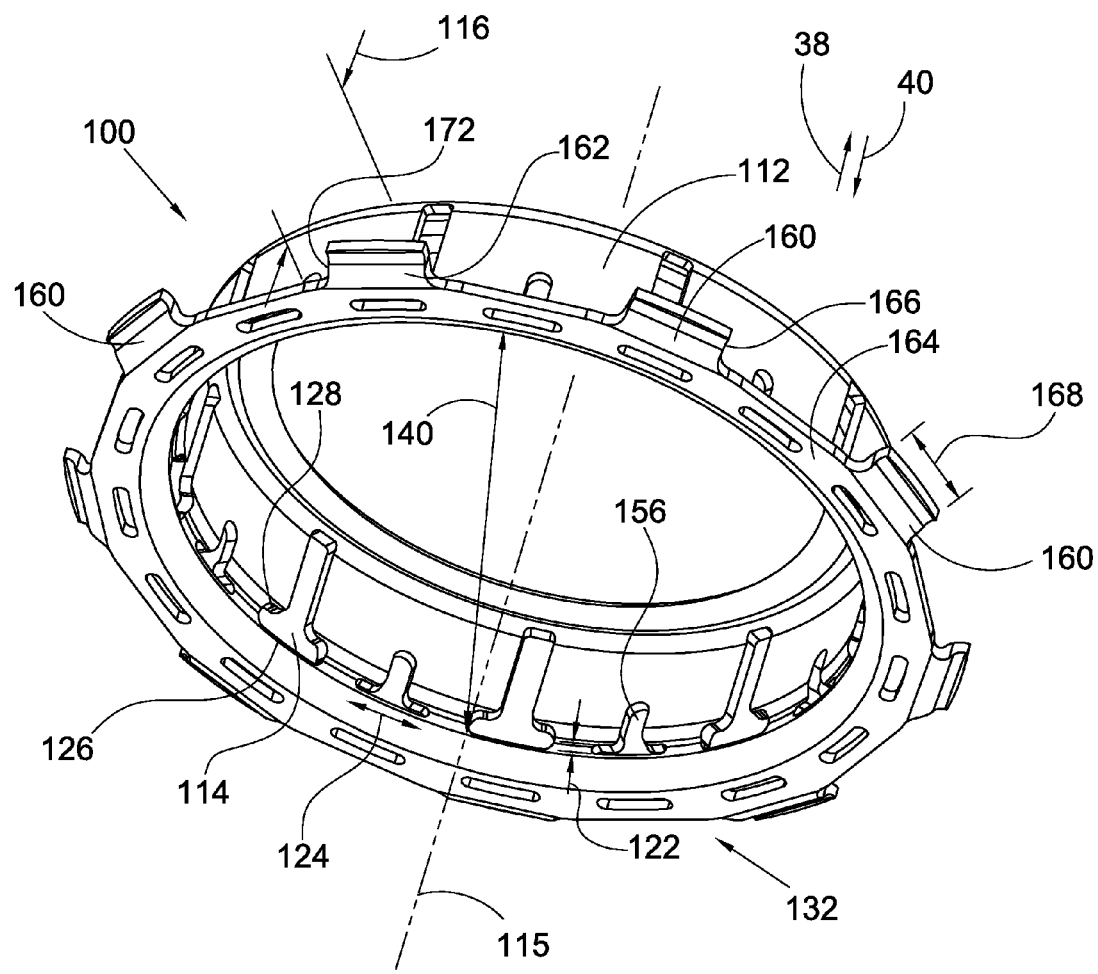
FIG. 2 is a perspective view of an inner clutch housing with present invention spring retention openings.

FIG. 2 is a perspective view of present invention inner clutch housing 100.

Figure 3:
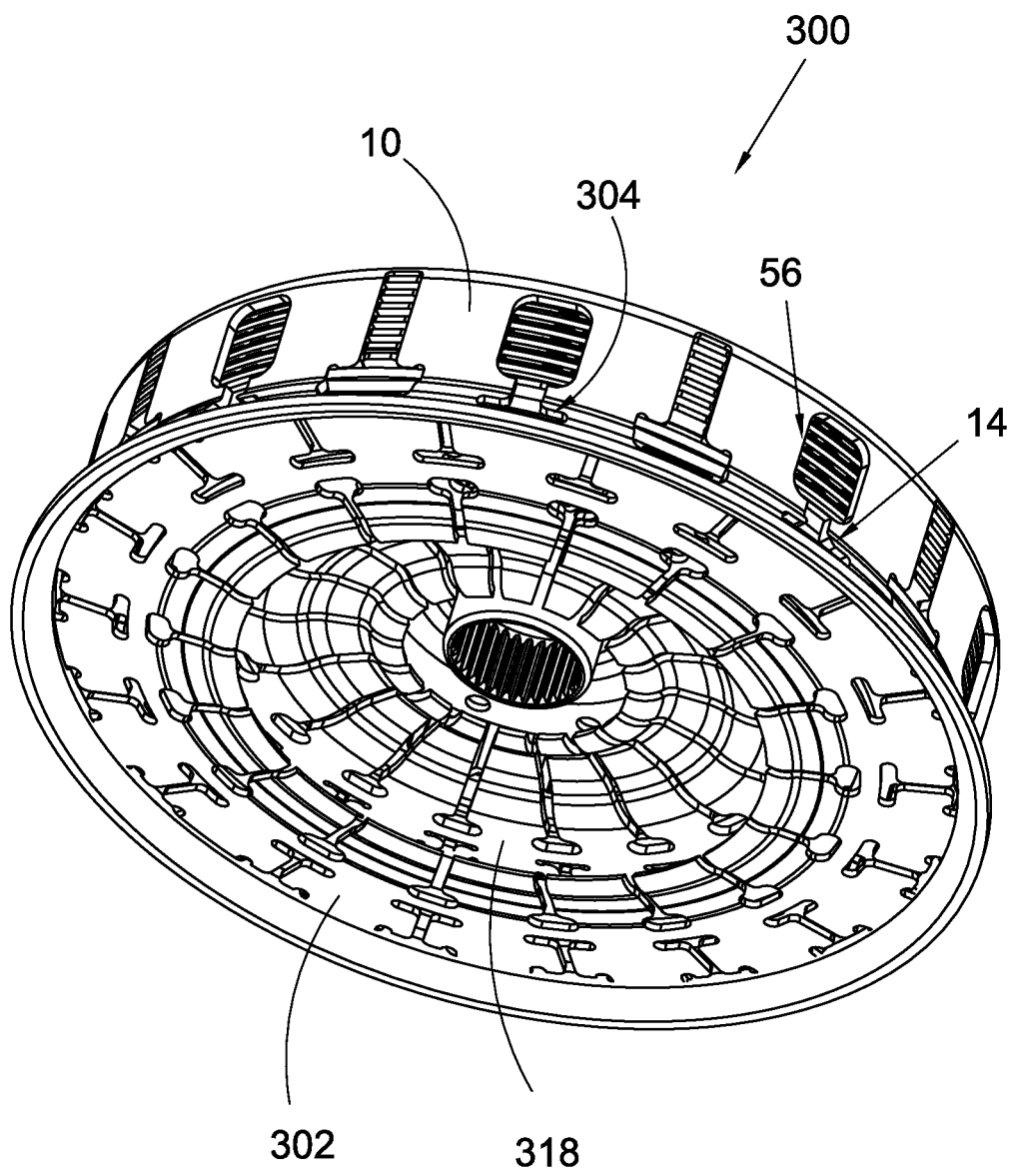
FIG. 3 is a perspective view of a dual clutch assembly including the clutch housings of FIGS. 1 and 2.

FIG. 3 is a perspective view of dual clutch assembly 300 including the clutch housings of FIGS. 1 and 2.

Figure 4:
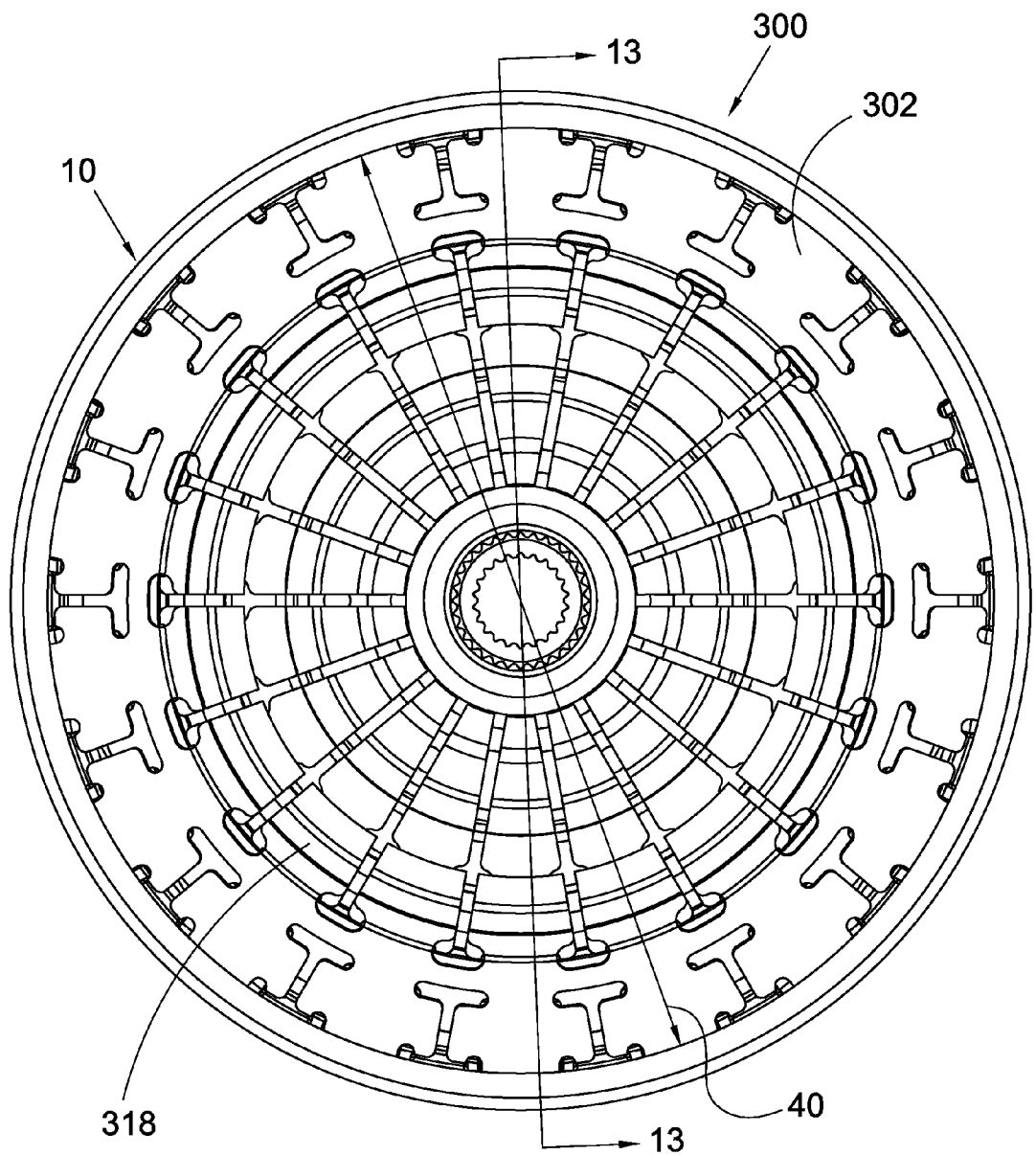
FIG. 4 is a top view the clutch assembly of FIG. 3.

FIG. 4 is a top view of clutch assembly 300 of FIG. 3.

Figure 5:
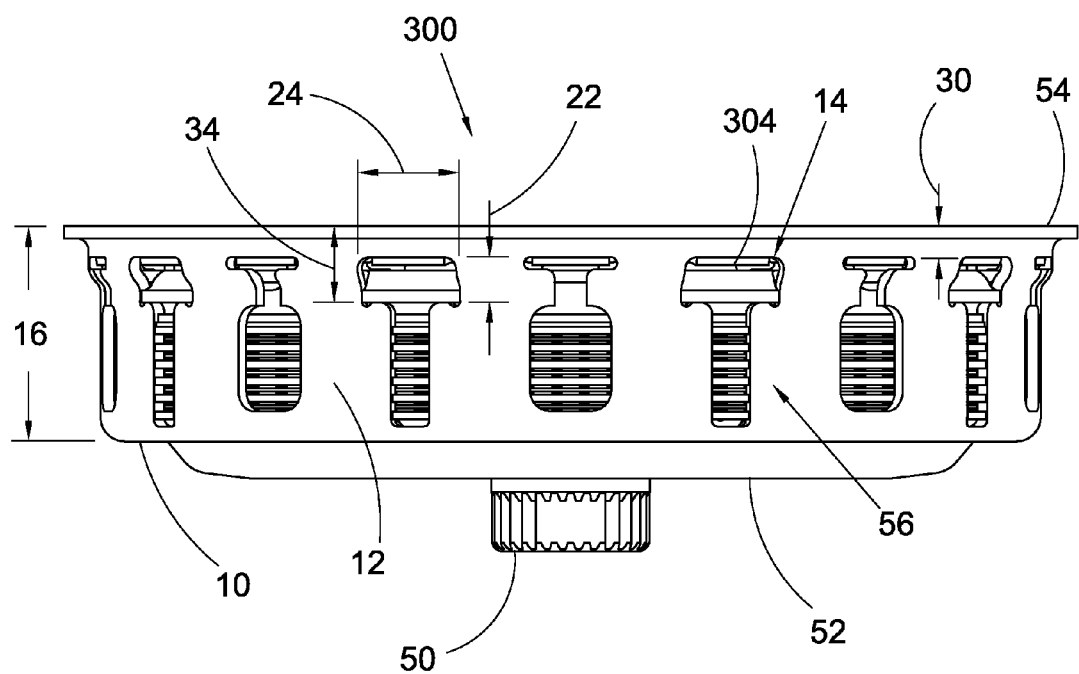
FIG. 5 is a side view of the assembly of FIG. 3.

FIG. 5 is a side view of assembly 300 of FIG. 3.

Figure 6:
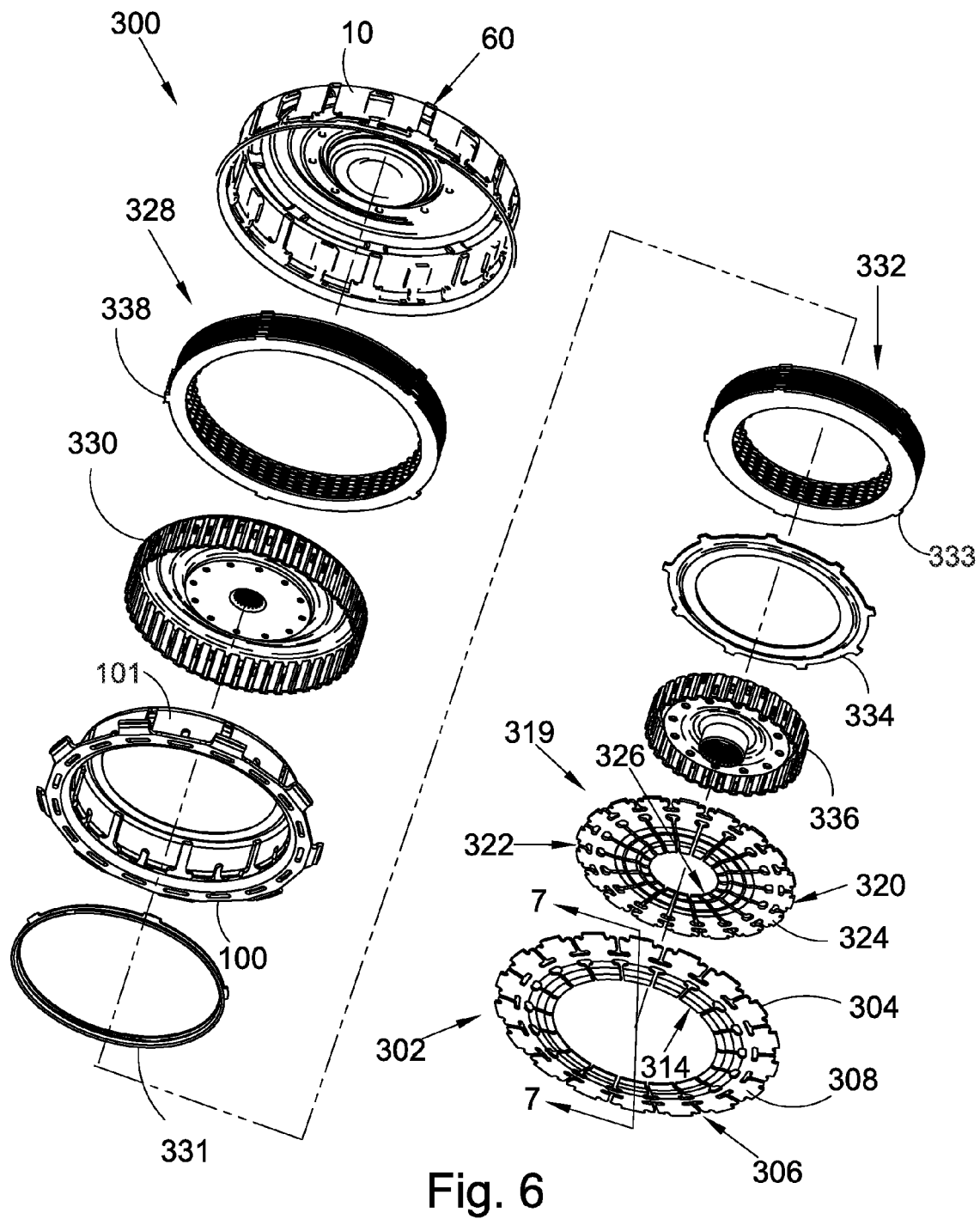
FIG. 6 is an exploded view of the assembly of FIG. 3.

FIG. 6 is an exploded view of assembly 300 of FIG. 3.

Figure 7A:
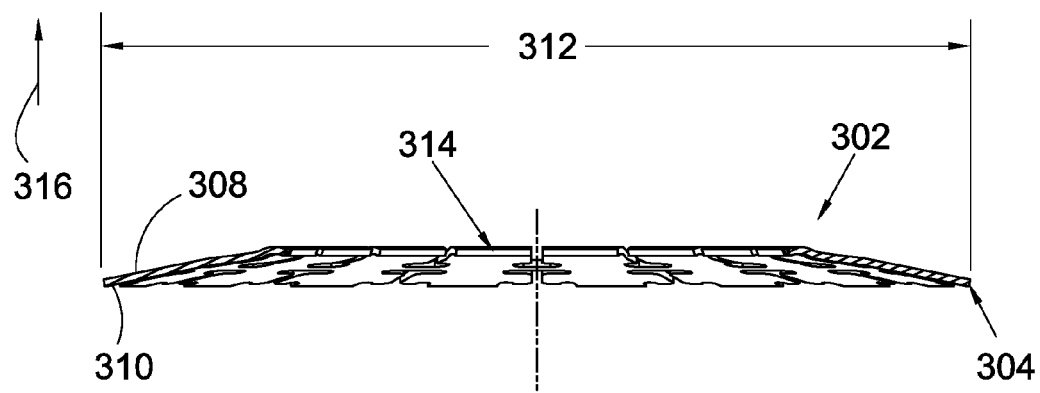
FIG. 7A is a cross-sectional view of the outer housing spring in FIG. 6, in a relaxed state, along line 7-7 in FIG. 6.

FIG. 7A is a cross-sectional view of the outer housing spring in FIG. 6, in a relaxed state, along line 7-7 in FIG. 6.

Figure 7B:
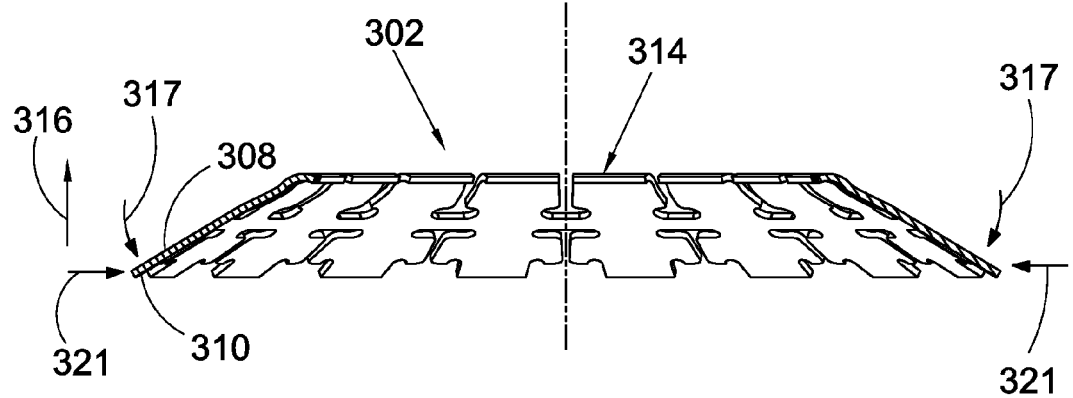
FIG. 7B is a cross-sectional view of the outer housing spring in FIG. 6, in a deformed state, along line 7-7 in FIG. 6.

FIG. 7B is a cross-sectional view of the outer housing spring in FIG. 6, in a deformed state, along line 7-7 in FIG. 6.

The following should be viewed in light of FIGS. 1, and 3-7B. Clutch housing 10 includes housing wall 12, openings 14 in wall 12, and longitudinal axis 15. Wall 12 is disposed circumferentially about axis 15. That is, in general, wall 12 is cylindrical in shape. However, it should be understood that wall 12 is not limited to the shape shown in the figures and that other shapes for wall 12 are included within the spirit and scope of the invention as claimed. For example, wall 12 is not limited to a particular height 16.

In FIG. 1, openings 14 are arranged to accept lever spring 302 from clutch assembly 300. That is, at least a portion of the spring is disposed within openings 14. Openings 14 are not limited to the shape shown in the figures. Other shapes for openings 14 are possible and are included within the spirit and scope of the invention as claimed. For example width 22 and length 24 of openings 14 can be varied. In some aspects, openings 14 are slots circumferentially aligned with wall 12. That is length 24 is greater than width 22 and the length is aligned with a circumference of the housing. Hereinafter, openings 14 are referred to as slots 14. Also, housing 10 is not limited to the number of slots 14 shown.

Slots 14 define top edge 26 and bottom edge 28 in wall 12. These edges are axially displaced with respect to axis 15. Spring 302 includes protrusions or fingers 304 extending from an outer circumference 306 of the lever spring. Fingers 304 include top side 308 and bottom side 310. Slots 14, and in particular, edges 26 and 28 are configured to engage fingers 304 when spring 302 is installed in housing 10. In general, at least some of edges 26 are configured to be in contact with respective top sides 308 and at least some of bottom edges 28 are configured to be in contact with bottom sides 310. The contact between edges 26 and sides 308 provides a reaction point to produce a force in axial direction 38. The contact between edges 28 and sides 310 provides a reaction point to produce a force in axial direction 40. In some aspects, the clutch assembly is installed to interface with bearing 390 and a force in direction 40 provides a bearing preload. In some aspects a force in direction 38 provides an axial force from the spring during application of assembly 300.

Protrusions 304 and slots 14 are arranged so that sides 308 and 310 are engaged or nearly engaged to edges 26 and 28, respectively, when spring 302 is installed in housing 10. By nearly engaged, we mean that the respective sides are separated by a nominal amount, typically associated with tolerances for the parts. In general, the spring sides are engaged to the slot edges to eliminate or minimize any movement of the fingers when forces are applied to the spring. For example, when clutch assembly 300 is operated, the reaction force in direction 38 is immediately generated since respective sides 310 and edges 28 are already in contact and the fingers can react to the edges with little or no axial movement. The engagement of the respective sides and fingers facilitates the engagement of the opposing sides and fingers. For example, the contact of sides 310 with edges 28 helps push sides 308 against edges 26 and vice versa.

In some aspects, slots 14 are axially aligned. Alternately stated, the slots are aligned along a common radial plane. Then, assuming width 22 is equal, although this is not necessary, for all the slots, edges 26 and 28 are aligned with respective radial planes. That is, distance 30 from end 32 of the housing is equal for all edges 26 and distance 34 for all edges 28 is equal.

In some aspects (not shown), slots 14 are axially displaced to preload spring 302. The axial displacement is accomplished by misaligning edges 26, misaligning edges 28, or misaligning both edges 26 and 28. For the first case, at least some of edges 26 are at a different distance 30 than the remaining edges 26. In the discussion that follows, the slots with the different edges 26 or 28 are referred to as misaligned slots. For the misaligned slots, distance 30 is greater than distance 30 for the remaining slots. This greater distance is calculated such that when spring 302 is installed in housing 10, the sides 308 corresponding to the misaligned slots are actively engaged with or reacting against edges 26. In this manner, spring 302 is preloaded in direction 40 and sides 310 are pushed against respective edges 28 for the remaining fingers not installed in the misaligned slots. For the second case, at least some of edges 28 are at different distance 34 than the remaining edges 28. For the misaligned slots, distance 34 is less than distance 34 for the remaining slots. This lesser distance is calculated such that when spring 302 is installed in housing 10, sides 310 corresponding to the misaligned slots are actively engaged with or reacting against sides 28. In this manner, spring 302 is preloaded in direction 38 and sides 308 are pushed against respective edges 26 for the remaining fingers not installed in the misaligned slots. The present invention is not limited to a particular combination or ratio of aligned or misaligned slots.

Spring 302 is formed with an outer diameter 312 that when in a relaxed state, is greater than inside diameter 40 of housing 10. This differential in diameters enables spring 302 to remain engaged with housing 10 without the use of additional fasteners. That is, at least a portion of respective fingers 302 are "trapped" within respective slots 14. To install spring 302 in housing 10, a force is applied to circumference 314 in axial direction 316 to reduce diameter 312. Specifically, the force is applied to spring 302 in FIG. 7A so that diameter 312 in FIG. 7B is less than diameter 40 of housing 10. In response, circumference 306 moves in directions 317 and 321. Then, spring 302 is inserted into housing 10, the axial force is released, spring 302 returns to its relaxed state (diameter 312 increases), and as circumference 306 expands, fingers 304 are pushed into respective slots 14.

In some aspects, slots 14 are fully enclosed by, surrounded by, or defined by wall 12 as shown in FIG. 1. In some aspects (not shown), some of slots 14 are in communication with end 32. That is, the slots open at least partially to end 32. In these aspects, portions of edges 26 are removed to form the opening.

FIG. 2 is a perspective view of present invention inner clutch housing 100. The following should be viewed in light of FIGS. 1 through 7B. Clutch housing 100 includes housing wall 112, openings 114 in wall 112, and longitudinal axis 115. Wall 112 is disposed circumferentially about axis 115. That is, in general, wall 112 is cylindrical in shape. However, it should be understood that wall 112 is not limited to the shape shown in the figures and that other shapes for wall 112 are included within the spirit and scope of the invention as claimed. For example, wall 112 is not limited to a particular height 116. Wall 112 includes radially outermost surface 101.

Openings 114 are arranged to accept lever spring 319 from clutch assembly 300. That is, at least a portion of the spring is disposed within openings 114. Openings 114 are not limited to the shape shown in the figures. Other shapes for openings 114 are possible and are included within the spirit and scope of the invention as claimed. For example width 122 and length 124 of openings 114 can be varied. In some aspects, openings 114 are slots circumferentially aligned with wall 112. That is length 124 is greater than width 122 and the length is aligned with a circumference of the housing. Hereinafter, openings 114 are referred to as slots 114. Also, housing 100 is not limited to the number of slots 114 shown.

Slots 114 define top edge 126 and bottom edge 128 in wall 112. These edges are axially displaced with respect to axis 115. Spring 319 includes protrusions or fingers 320 extending from an outer circumference 322 of the lever spring. Fingers 320 include top side 324 and a bottom side (not visible in FIG. 6, but oriented as shown for side 310 in the figures). Spring 319 also has an inner circumference 326 and an outer diameter when in a relaxed state. Slots 114, and in particular, edges 126 and 128 are configured to engage fingers 320 when spring 318 is installed in housing 100. Housing 100 has an inner diameter of 140. The discussion regarding slots 14, edges 26 and 28, diameter 40, spring 302, sides 308 and 310, diameter 312, circumference 314, and direction 316 in the descriptions for FIGS. 1 and 3 through 7B is applicable to slots 114, edges 126 and 128, diameter 140, spring 318, side 324, the bottom side of fingers 320, the relaxed diameter of spring 319, and circumference 326. For the sake of brevity, the preceding discussions are not repeated here. In some aspects, the clutch assembly is installed to interface with bearing 190 and a force in direction 40 provides a bearing preload. In some aspects a force in direction 38 provides an axial force from the spring during application of assembly 300.

Returning to FIG. 5, in some aspects, housing 10 includes hub 50. End wall 52 extends to hub 40 and in some aspects; end wall 52 is connected to the hub using extruded rivets, a relatively cost-effective process. However, it should be understood that other methods, such as separate rivets or mechanical fasteners, or welding, can be used to secure end wall 52 to hub 50.

Although in general, two or more slots 14 or 114 are preferred, any number of slots 14 or 114 is possible and such number of slots is included within the spirit and scope of the invention as claimed. Also, the present invention is not limited to any particular configuration or spacing of slots 14 or 114.

In some aspects, housings 10 and 100 are stamped, reducing fabricating cost and complexity. However, it should be understood that other fabrication methods can be used to form housings 10 or 100. In some aspects, walls 12 and 112 are pierced after the forming process to create slots 14 and 114, respectively, eliminating the need for roll forming, with its attendant complexities and costs. Also, since the slots are made after the forming process, potential deformation and dimensional variation are reduced. Housing 10 also is formed with lip 54, which provides continuous support about edge 32 of housing 10, in particular providing support to resist the hoop stresses to which housing 10 is subjected during use. In some aspects, openings 56 and 156 are provided to provide addition flow of cooling fluid in housings 10 and 100, respectively.

Assembly 300 can be formed in any way known in the art. In some aspects, clutch pack 328, carrier ring 330, and flow dam/fulcrum 331 are installed in housing 10. Pack 332, fulcrum 334, and carrier ring 336 are installed in housing 100 and housing 100 is inserted in housing 10. Plate spring 319 is installed in housing 100 and plate spring 302 is installed to in housing 10. Pack 332 includes tabs 333. However, it should be understood that the present invention is not limited to use with the number, type, and configuration of components shown for assembly 300 and other number, type, and configuration of components can be used with the present invention.

It should be understood that any means known in the art, for example, complimentary splines and notches can be used to connect clutch packs 328 and 332 to housings 10 and 100, respectively. In addition, in some aspects, a tab and slot arrangement as described in the commonly assigned United States Provisional Patent Application titled "CLUTCH HOUSING WITH OPENINGS TO ENGAGE A CLUTCH PLATE," inventors Sturgin et al., filed on the same day as the present application, can be used. For example, tabs 338 of clutch pack 328 engage with slots 60 in housing 10.

Figure 8A:
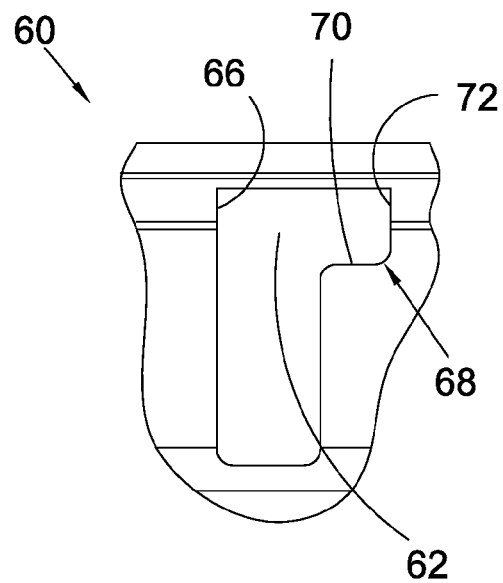
FIGS. 8A through 8C are partial side views of a present invention outer housing illustrating inner housing retaining slots and tabs for an inner housing.
Figure 8B:
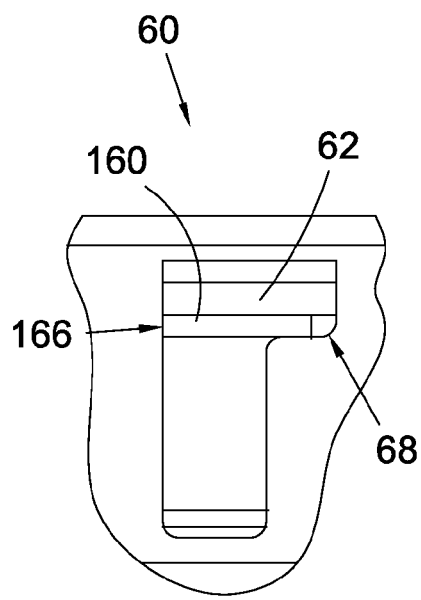
Figure 8C:
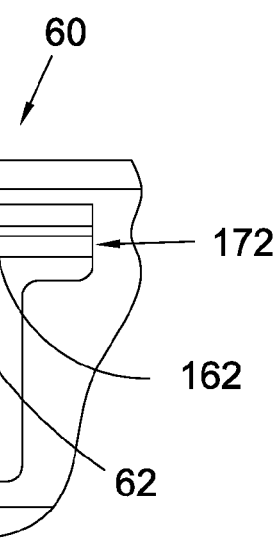

FIGS. 8A through 8C are partial side views of a present invention outer housing 60 illustrating inner housing retaining slots 62 and tabs 160 and 162 for inner housing 100. The following should be viewed in light of FIGS. 1 through 8C. In some aspects, housing 60 includes slots 62 used to engage tabs 160 and 162. In some aspects, housing 60 is similar to housing 10 and in the discussion that follows, housings 10 and 60 are interchangeably referenced. The tabs are located on flange 164. In general, housing 10 experiences torque from a drive unit (not shown) in direction 64. Housing 10 transmits the drive unit torque to housing 100. In some aspects, slots 62 and tabs on flange 164 used to transmit the torque. Specifically, surfaces 66 in the slots are arranged to engage edges 166 of tabs 160. In general, it is advantageous to maximize the contact surface areas for surfaces 66 and 166 to minimize surface pressure and subsequent wear or deformation of the slots and tabs. Therefore, the number of tabs 160 on housing 100 is maximized. However, it should be understood that the present invention is not limited to a particular number of tabs 160 or a particular percentage of tabs 160 with respect to tabs 162. It is advantageous to form openings, such as slots 62 with larger radius corners, such as corners 68, since this configuration enables the use of more robust punches and die blocks. Therefore, in some aspects, width 168 of tabs 160 is selected such that the tabs do not contact corners 68 of slots 62. Surface 70 in slots 62 provides a surface to react axial forces associated with a clutch actuator (not shown).

In some aspects, tabs 162 are configured to prevent rotation of housing 100, with respect to housing 60, in direction 64. By preventing such rotation, tabs 160 are prevented from engaging corners 68. The torque related to such a rotation is generated during the coast condition, that is, when the transmission (not shown) is turning faster than the drive unit. The coast condition generates a relatively low torque and subsequently, relatively low surface pressure. Therefore, in some aspects, fewer tabs 162 are needed than tabs 160. For example, in FIG. 2, only three tabs 162 are formed on housing 100. However, it should be understood that housing 100 is not limited to any particular number of tabs 162. Edges 172 of tabs 162 engage surfaces 72 of slots 62. Tabs 162 are typically not needed to react axial forces, therefore, in some aspects, the tabs are bent in direction 40 to clear corner 68.

Figure 9:
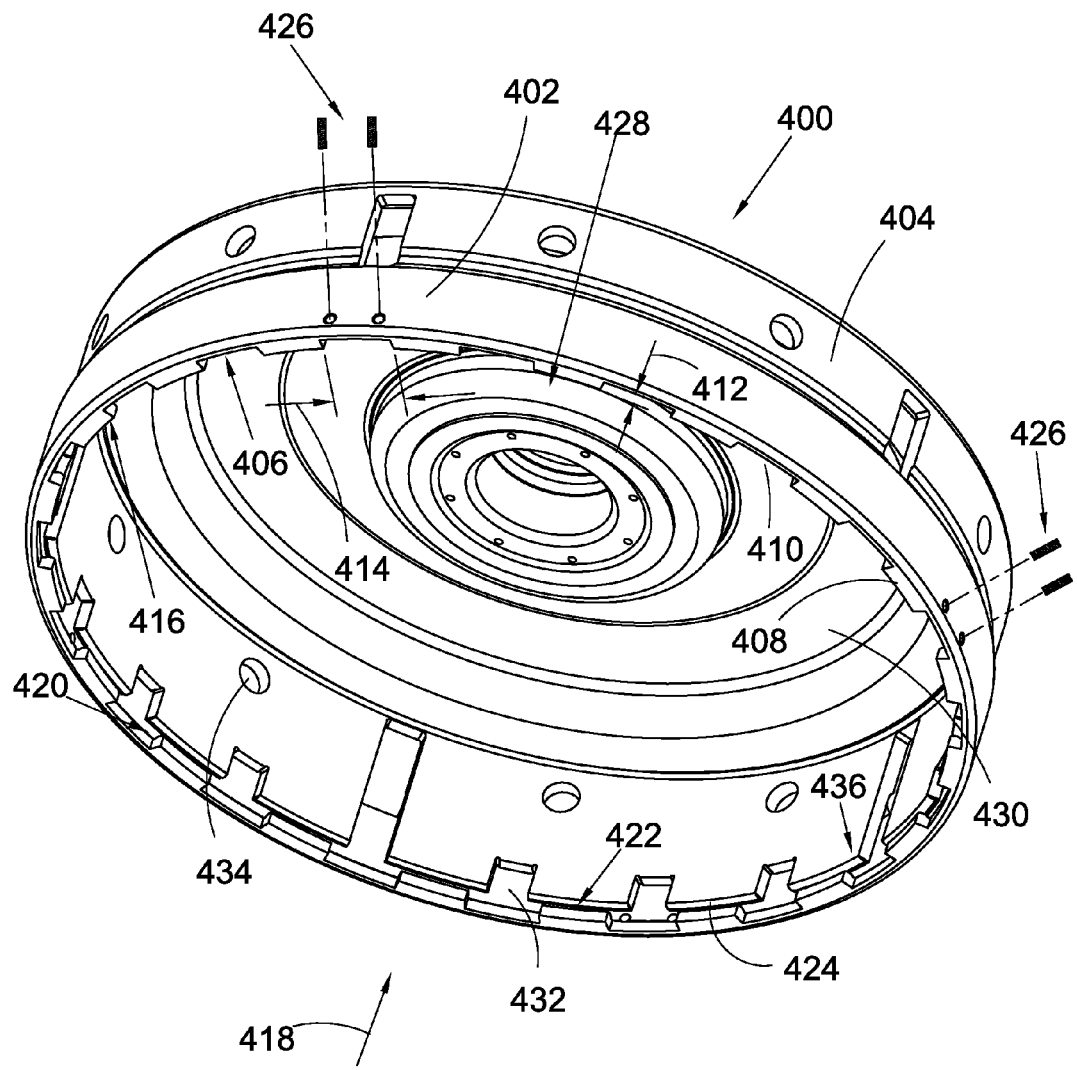
FIG. 9 is a perspective view of an outer clutch housing with a present invention spring retention device.

FIG. 9 is a perspective view of outer clutch housing 400 with present invention spring retention device 402.

Figure 10:
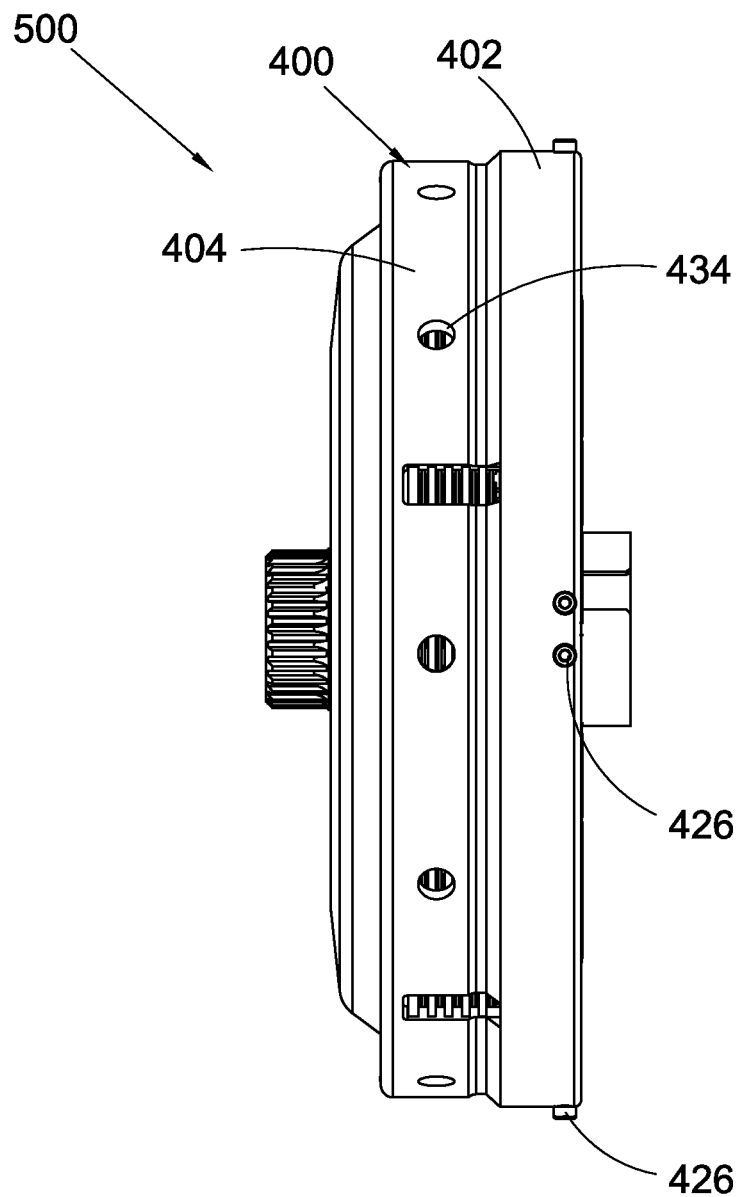
FIG. 10 is a side view of a dual clutch assembly including the clutch housing of FIG. 9.

FIG. 10 is a side view of dual clutch assembly 500 including the clutch housing of FIG. 9.

Figure 11:
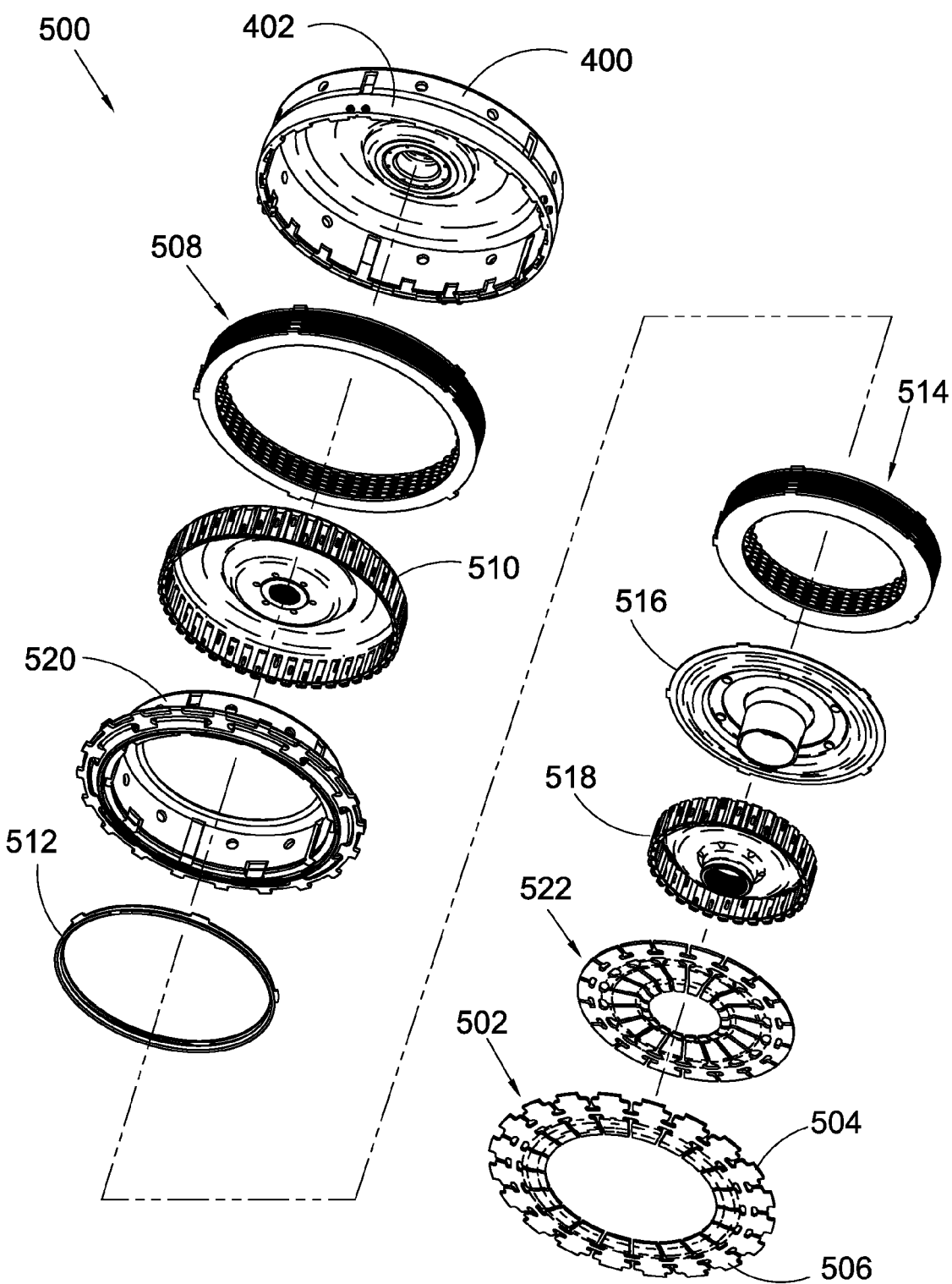
FIG. 11 is an exploded view of the assembly of FIG. 10.

FIG. 11 is an exploded view of assembly 500 of FIG. 10. The following should be viewed in light of FIGS. 9 through 11. Retention device 402 is attached to wall 404 of housing 400. Device 402 is used to secure spring 502 to housing 400. In the figures, device 402 is a separate element joined to wall 404. However, it should be understood that device 402 can be formed integral to wall 404. Device 402 can be fastened to the wall using any means known in the art, including welding, for example, Gas Metal Arc Welding (otherwise known as MIG welding). Device 402 includes lip 406, which extends radially from the wall, in particular, radially inward. Lip 406 includes segments 408 and openings 410. Openings 410 are not limited to the shape shown in the figures. Other shapes for openings 410 are possible and are included within the spirit and scope of the invention as claimed. For example width 412 and length 414 of openings 410 can be varied. In some aspects, length 414 is greater than width 412 and the length is aligned with a circumference of the housing. Hereinafter, openings 410 are referred to as slots 410. Also, housing 400 is not limited to the number of slots 410 shown. The slots are in communication with inner circumference 416. That is, the slots open to the inner circumference.

To install spring 502 in housing 400, it is not necessary to deform the spring as discussed in the descriptions for FIGS. 1 through 7B. Instead, the spring is inserted in axial direction 418 with fingers 504 aligned with slots 410. The slots accept at least a portion of the spring, specifically, the spring fingers. When the fingers are axially aligned with space 420 formed between bottom surfaces 422 of segments 408 and edges, or annular surfaces, 424 of wall 404, the spring is rotated so that top side 506 of fingers 504 axially align with segments 408.

That is, the fingers are axially disposed between surfaces 422 and edges 424. This configuration axially retains the spring. To maintain the circumferential position of the spring, blocking element 426 is attached to wall 404. Element 426 is circumferentially aligned with space 420. In some aspects, element 426 is removable to allow the rotation of the spring in space 420 during the installation of the spring in housing 400. For example, element 426 includes one or more threaded fasteners as shown in the figures. In some aspects (not shown), element 426 is fixedly secured to housing 400 after the spring is inserted and rotated. For example, element 426 is a block welded to the housing. Thus, the blocking element is arranged to prevent rotational movement of the spring after the openings have accepted the spring. It should be understood that the present invention is not limited to any particular number or configuration of elements 426.

Finger 504 includes bottom surfaces (not visible) corresponding to bottom surfaces 310 for spring 302 in FIG. 6. Top sides 506 and the bottom sides engage surfaces 422 and edges 424, respectively. The discussion of sides 308 and 310, edges 26 and 28, and axial forces in the descriptions for FIGS. 1 through 7B is applicable to sides 506, the bottom sides of fingers 504, surfaces 422, edges 424, and axial forces related to spring 502 in housing 400, respectively, and is not repeated here.

In some aspects, housing 400 includes integral hub 428. End wall 430 extends to hub 428. In some aspects (not shown), hub 428 is separate from housing 400 and is connected to end wall 430 using rivets or other methods, such as other mechanical fasteners or welding. In some aspects, openings 432 and 434 are included to facilitate fluid flow through housing 400. In some aspects (not shown), only one of openings 432 or 434 are included. Housing 400 is not limited to a particular number, shape, size, configuration, or ratio of openings 432 or 434.

Although in general, two or more slots 410 are preferred, any number of slots 410 is possible and such number of slots is included within the spirit and scope of the invention as claimed. Also, the present invention is not limited to any particular configuration or spacing of slots 410.

In FIG. 9, housing 400 is machined. However, in some aspects (not shown), housing 400 is stamped. The discussion regarding housings 10 and 100 and stamping in the descriptions for FIGS. 1 through 8C is applicable to stamped aspects of housing 400. Element 402 provides continuous support about edge 436 of housing 400, in particular providing support to resist the hoop stresses to which housing 400 is subjected during use.

Assembly 500 can be formed in any way known in the art. In some aspects, clutch pack 508, carrier ring 510, and flow dam/fulcrum 512 are installed in housing 400. Pack 514, fulcrum 516, carrier ring 518 are installed in housing 520 and housing 520 is inserted in housing 400. Plate spring 522 is installed in housing 520 and plate spring 502 is installed in housing 400. However, it should be understood that the present invention is not limited to use with the number, type, and configuration of components shown for assembly 500 and other number, type, and configuration of components can be used with the present invention.

It should be understood that any means known in the art can be used to adjust the clutch assemblies shown in the figures. In addition, in some aspects, the method described in the commonly assigned United States Provisional Patent Application titled "DUAL CLUTCH PACK DUAL OPERATING CLUTCH AND METHOD FOR ADJUSTING SAME," inventors Uhler et al., filed on the same day as the present application, can be used.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A first clutch assembly, comprising:
   a clutch housing including:
      a substantially cylindrical housing wall; and,
      a first opening passing through the housing wall and including first and second edges formed by the cylindrical housing wall, the first and second edges axially separated from each other;
   a lever spring including a first protrusion:
      extending in a radially outward direction;
      at least partially disposed in the first opening;
      including a top in contact with the first edge; and,
      a bottom side in contact with the second edge; and,
   a clutch pack including a plurality of tabs:
      extending in the radially outward direction; and
      at least partially disposed in the first opening, wherein no portion of the clutch housing is detachable from remaining portions of the clutch housing.

2. The first clutch assembly of claim 1 wherein said contact with said first edge is arranged to provide a first force in a first axial direction and said contact with said second edge is arranged to provide a second force in a second axial direction, opposite said first axial direction.

3. The first clutch assembly of claim 1 wherein said first opening further comprises a slot circumferentially aligned with said housing wall.

4. The first clutch assembly of claim 1 wherein said first opening is fully enclosed by said housing wall.

5. The first clutch assembly of claim 1 wherein said housing wall further comprises a first diameter, said lever spring further comprises, in a relaxed state, a second diameter, and said second diameter is greater than said first diameter.

6. The first clutch assembly of claim 1 wherein said housing is stamped.

7. The first clutch assembly of claim 1 wherein said housing wall further comprises a section with a lip extending radially from said housing wall, said lip with an inner circumference and said first opening is disposed in said lip and in communication with said inner circumference.

8. The housing of claim 7 wherein said housing is machined.

9. The first clutch assembly of claim 7 wherein said section is integral to said housing wall.

10. The first clutch assembly of claim 1 further comprising an outer clutch housing with at least one second opening, wherein:
    the first clutch housing is an inner clutch housing;
    the first clutch housing includes a plurality of radial protrusions at least partially disposed in the at least one second opening.

11. The first clutch assembly of claim 10 wherein said at least one second opening further comprises a first radial edge and a first axial edge, a first protrusion in said plurality of protrusions comprises a first radial surface and a first axial surface, said first axial edge is arranged to contact said first axial surface and transfer torque to said first axial surface, and said first radial edge is arranged to contact said first radial surface.

12. The first clutch assembly of claim 11 wherein said at least one second opening further comprises a second axial edge circumferentially displaced from said first axial edge, a second protrusion in said plurality of protrusions comprises a second axial surface, and said second axial edge is arranged to contact said second axial surface and to prevent rotational movement of said housing with respect to said inner clutch housing.

13. The first clutch assembly of claim 12 wherein said at least one second opening further comprises a second radial edge, axially displaced from said first radial edge, said second protrusion comprises a second radial surface, and said second radial edge and said second radial surface are axially opposed and axially displaced one to the other.

14. The first clutch assembly of claim 1, wherein:
the clutch housing includes a plurality of openings;
the plurality of openings includes:
    the first opening; and,
    a second opening passing through the housing wall;
the lever spring includes a plurality of protrusions extending in the radially outward direction;
the plurality of protrusions includes the first protrusion and a second protrusion;
the second protrusion is at least partially disposed in the second opening;
every opening in the clutch housing in which a protrusions from the plurality of protrusions is at least partially disposed is included in the plurality of openings;
every protrusion extending from the outer circumference of the lever spring and at least partially disposed in an opening included in the plurality of openings is included in the plurality of protrusions;
the first protrusion is the only protrusion included in the plurality of protrusions and at least partially disposed in the first opening; and,
the second protrusion is the only protrusion included in the plurality of protrusions and at least partially disposed in the second opening.

* * * * *